(12) United States Patent
Greenhalgh

(10) Patent No.: US 7,179,024 B2
(45) Date of Patent: Feb. 20, 2007

(54) TOOL WITH DEPLOYABLE CUTTING BLADE

(75) Inventor: E. Skott Greenhalgh, Wyndmoor, PA (US)

(73) Assignee: Stout Medical Group, L.P., Perkasie, PA (US)

( * ) Notice: Subject to any disclaimer, the term of this patent is extended or adjusted under 35 U.S.C. 154(b) by 81 days.

(21) Appl. No.: 10/825,519

(22) Filed: Apr. 15, 2004

(65) Prior Publication Data

US 2004/0208717 A1    Oct. 21, 2004

Related U.S. Application Data

(60) Provisional application No. 60/463,814, filed on Apr. 17, 2003.

(51) Int. Cl.
*B23B 51/00* (2006.01)

(52) U.S. Cl. ................................. 408/224; 606/80

(58) Field of Classification Search .................. 408/54, 408/30, 22, 24, 93, 148, 150, 153–154, 156, 408/158, 159, 173, 180, 187, 189, 211, 223–224, 408/174, 178; 82/1.2; 606/80, 79, 84, 82, 606/176, 177, 178, 179, 180
See application file for complete search history.

(56) References Cited

U.S. PATENT DOCUMENTS

| 402,394 A | 4/1889 | Brown |
| 2,756,968 A * | 7/1956 | Emanuel et al. ............ 175/269 |
| 2,872,160 A * | 2/1959 | Barg ............................ 175/269 |
| 3,019,712 A | 2/1962 | Winberry, Jr. .................. 90/11 |
| 3,572,182 A | 3/1971 | MacDonald ................. 77/73.5 |
| 3,806,271 A | 4/1974 | Ishiguro et al. ............. 408/159 |
| 3,815,694 A | 6/1974 | Giustino ..................... 175/289 |
| 4,411,324 A | 10/1983 | Liebig ........................ 175/289 |
| 4,729,699 A | 3/1988 | Frazzoli ...................... 408/152 |
| 4,738,255 A | 4/1988 | Goble et al. ............ 128/92 YF |
| 4,992,010 A | 2/1991 | Fischer ....................... 408/159 |
| 5,797,709 A | 8/1998 | Payne ......................... 408/159 |
| 6,036,695 A | 3/2000 | Smith .......................... 606/79 |
| 6,283,971 B1 | 9/2001 | Temeles ...................... 606/81 |

* cited by examiner

*Primary Examiner*—Monica Carter
*Assistant Examiner*—Jamila O. Williams
(74) *Attorney, Agent, or Firm*—Levine Bagade Han LLP

(57) ABSTRACT

A tool having a deployable cutting blade for making an undercut in a substrate is disclosed. The tool has a chamber positioned between its cutting tip and its tang. The cutting blade is movably mounted within the chamber. The blade is movable by sliding, pivoting or deflecting on a cantilever mounting and is movable between a retracted position within the chamber and an extended position projecting outwardly to engage and cut the substrate. Actuators for moving the blade include an eccentric cam mounted on a camshaft, a push rod and an inflatable balloon. Blades are also resiliently mounted and oriented so that their engagement with the substrate will cause them to retract into the chamber when the tool rotates in one direction and deploy into the extended position when the tool rotates in the opposite direction.

20 Claims, 9 Drawing Sheets

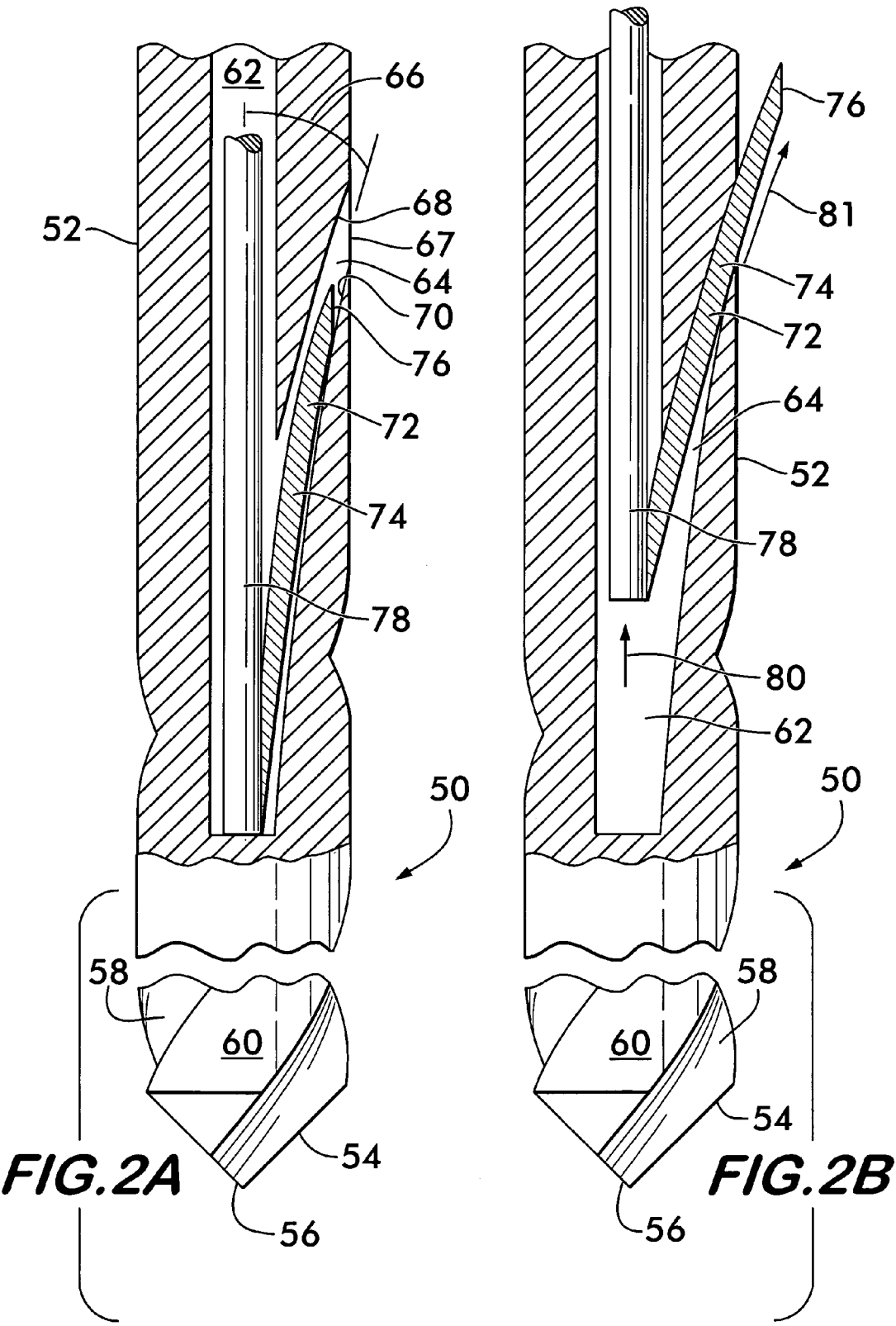

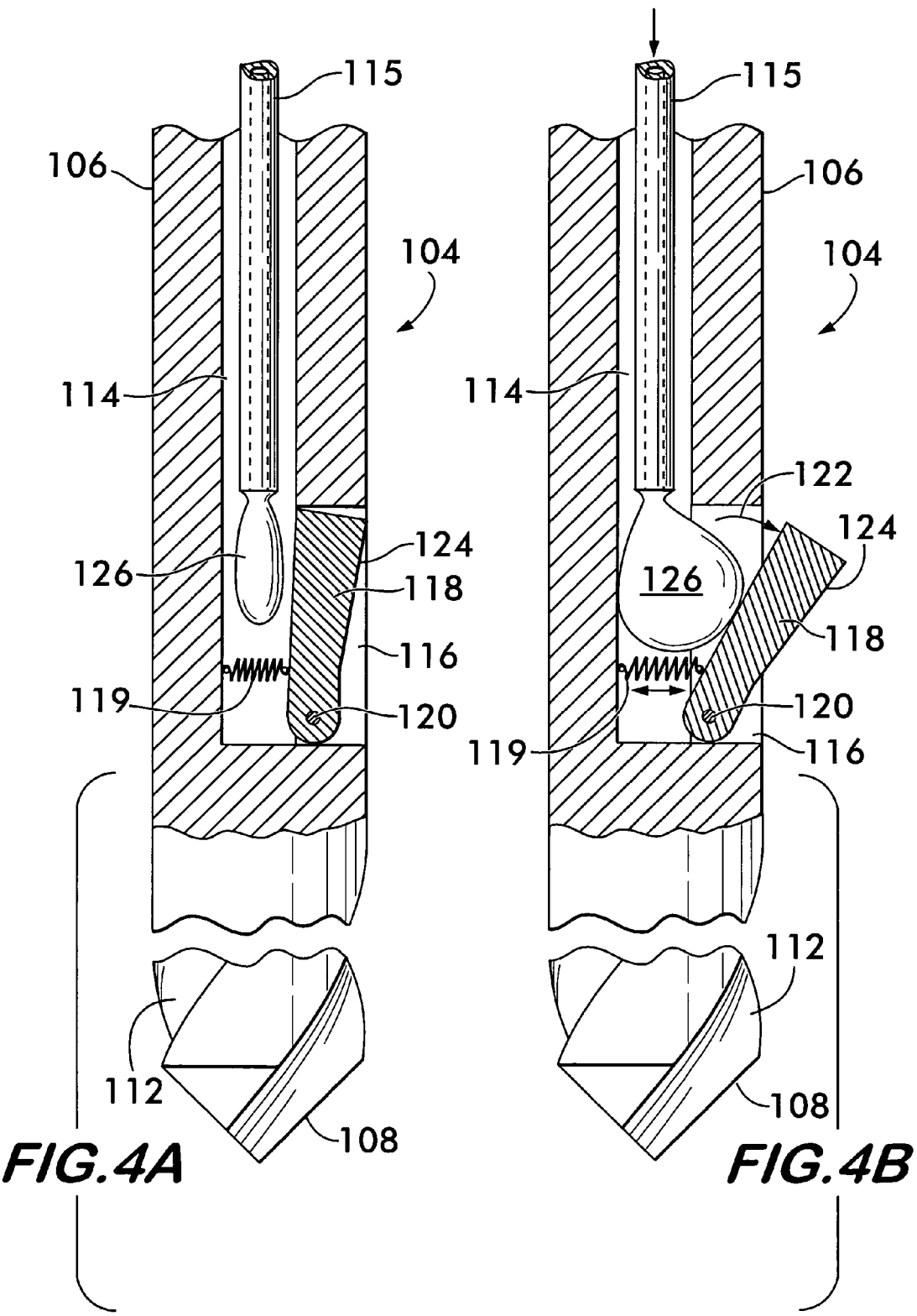

TOOL WITH DEPLOYABLE CUTTING BLADE

FIELD OF THE INVENTION

The invention concerns tools having a cutting tip and a cutting blade which may be deployed to make an undercut while drilling a hole in a substrate.

BACKGROUND OF THE INVENTION

It is often desirable to create a cavity or undercut in an inaccessible portion of a substrate, such as a back face or between the opposite faces of the substrate, the undercut having dimensions larger than the hole drilled into the substrate. Such undercuts are especially useful to attach fastening devices to brittle or low strength substrates because they allow the use of expanding anchoring devices which can spread the load over a greater area of the substrate, thereby lowering the stress and increasing the pull-out strength of the fastener.

Bone matter is one example of a substrate in which expanding anchors may be used to good effect. When used in bone matter, conventional fasteners, such as screws, fail at relatively low loads because the screw distributes the load only to a small area of the substrate immediately around the screw, resulting in high stresses in the substrate. Fastener loads in bone matter are also limited by the composition of the bone matter, which comprises a relatively hard cortical layer surrounding an inner cancellous layer of relatively soft tissue. The cancellous layer is largely ineffective at retaining the fastener, thus concentrating the load from the fastener entirely in the hard cortical tissue and raising the stress even further.

To deploy an expanding anchor in bone matter, it is advantageous to create an undercut in the cancellous layer behind the cortical layer, the undercut having a larger diameter than the hole drilled through the cortical layer and thereby forming a shoulder on the inaccessible back face of the cortical layer. The anchor is inserted through the drilled hole, allowed to expand within the undercut and engage the shoulder to spread the load over a relatively large area of the back face of the cortical layer, resulting in reduced stress and increased fastener pullout loads.

Existing apparatus for creating undercuts in back faces or beneath substrate surfaces tend to be specialized tools which are inserted into a pre-drilled pilot hole to a predetermined depth. A cutting blade is then deployed from the tool and the tool is rotated to carve out the undercut and form the shoulder beneath the surface of the substrate. Such tools tend to be complicated and require an extra step in that a pilot hole must first be drilled into the substrate and then the tool employed to carve out the undercut in the otherwise inaccessible interior or back face. There is clearly a need for a simpler tool which combines both the operation of drilling the pilot hole and creating the undercut beneath the surface of the substrate.

SUMMARY OF THE INVENTION

The invention concerns a tool having both a cutting tip for drilling a hole and a deployable cutting blade for carving an undercut in an otherwise inaccessible portion of a substrate into which the tool is advanced. The undercut may be positioned, for example, on a back face of the substrate, or at a predetermined depth beneath the substrate's surface.

The tool according to the invention for making an undercut in a substrate comprises an elongated bit shaft having a cutting tip positioned at one end and a tang positioned at an opposite end. The tang allows the bit shaft to be attached to a drill. The bit shaft is rotatable about a lengthwise axis to bore an opening in the substrate with the cutting tip. A chamber is located within the bit shaft and positioned between the cutting tip and the tang. The chamber has an opening providing access to it. A cutting blade is positioned within the chamber. The cutting blade is movable between a retracted position within the chamber and an extended position projecting outwardly from the bit shaft through the opening. One of various means for moving the cutting blade between the retracted and extended positions are provided, the cutting blade forming the undercut when in the extended position upon rotation of the bit shaft.

In one embodiment, the blade moving means comprises a cam rotatably mounted within the chamber adjacent to the cutting blade. The bit shaft includes a slot extending between the chamber and the opening. The cutting blade engages the slot and is guided by it. A cam follower is mounted on the cutting blade and engages the cam. Rotation of the cam relative to the bit shaft moves the cutting blade through the slot between the retracted and extended positions. A camshaft is attached to the cam and extends lengthwise through a passageway in the bit shaft toward the tang. Rotation of the camshaft effects rotation of the cam for deploying and retracting the cutting blade.

In another embodiment, the moving means comprises a bore extending longitudinally through the bit shaft, the bore being in communication with the chamber. The chamber includes a passageway oriented angularly with respect to the bore and having at least one guide surface engageable with the blade for guiding it through the passageway. An actuating rod is positioned within the bore and is attached to the blade. The blade is movable through the passageway between the retracted and extended positions upon lengthwise motion of the actuating rod through the bore.

In still another embodiment, the blade moving means comprises an axle positioned within the chamber. The chamber is in this case defined by first and second sidewalls angularly oriented with respect to one another. The axle is substantially lengthwise aligned with and offset from the centerline of the bit shaft. The cutting blade is mounted on the axle between the sidewalls for pivoting motion into and out of the chamber. Rotation of the bit shaft in a first direction (preferably the direction of advance of the tool through the substrate) causes the blade member to pivot on the axle and move into the chamber against the first sidewall upon contact between the blade and the substrate. Rotation of the bit shaft in an opposite direction causes the cutting blade to pivot on the axle and move out of the chamber and into engagement with the second sidewall upon contact between the blade and the substrate.

The moving means may also comprise an axle mounted within the chamber. The cutting blade is mounted on the axle for pivoting motion between the retracted and extended positions. A biasing member is connected between the bit shaft and the cutting blade for biasing the cutting blade into the retracted position. An inflatable balloon is positioned within the chamber adjacent to the cutting blade. A passageway extends along the bit shaft for conducting a pressurized fluid to and from the balloon for inflation and deflation thereof. The cutting blade is engaged by the balloon upon inflation thereof and is pivoted on the axle into the extended position, the biasing member pivoting the cutting blade into the retracted position upon deflation of the balloon.

In a further example, the moving means comprises a flexible resilient beam having a first end mounted within the chamber and an opposite end. The beam is oriented substantially lengthwise along the bit shaft. The chamber has a sidewall, and the cutting blade is mounted on the opposite end of the beam and adjacent to the sidewall. The beam is biased to normally position the cutting blade in the extended position, the blade being held in the extended position by contact with the substrate upon rotation of the bit shaft in a direction tending to force the cutting blade against the sidewall. The cutting blade is resiliently deflected into the chamber by contact with the substrate upon rotation of the bit shaft in an opposite direction.

BRIEF DESCRIPTION OF THE DRAWINGS

FIGS. 2A and 2B are partial longitudinal sectional views of another embodiment of a tool according to the invention;

FIGS. 4A and 4B are partial longitudinal sectional views of still another embodiment of a tool according to the invention;

Detailed Description of the Preferred Embodiments

Figure 1:
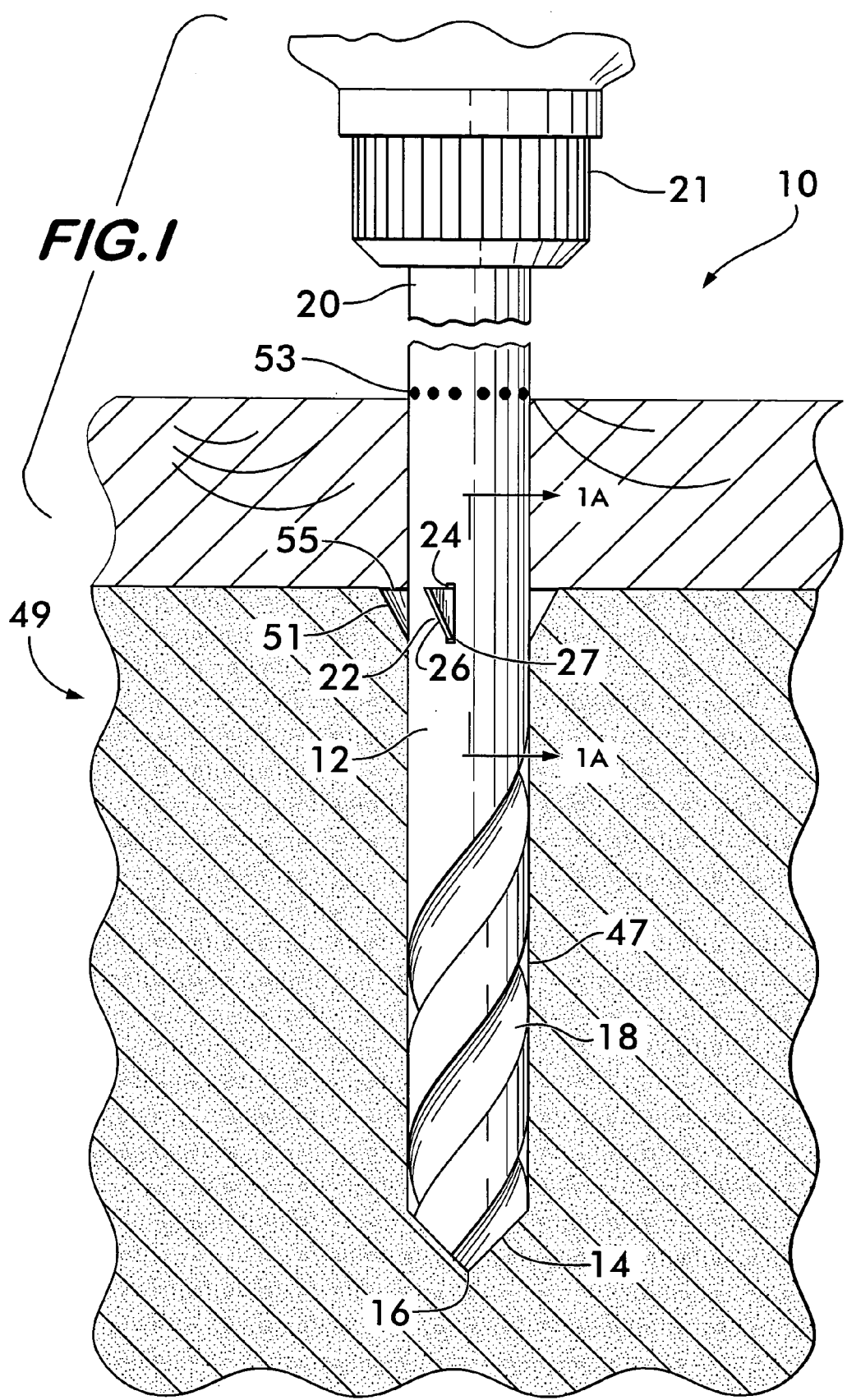
FIG. 1 is a side view of a tool having a deployable cutting blade according to the invention.

FIG. 1 shows an embodiment 10 of a tool with a deployable cutting blade for making an undercut according to the invention. Tool 10 comprises an elongated bit shaft 12 having opposed angularly oriented cutting edges 14 arranged at a cutting tip 16. Helical grooves 18 extend longitudinally along the bit shaft 12 to facilitate removal of cutting debris generated by the cutting edges 14. A tang 20 is positioned at the opposite end of the bit shaft 12. The tang is preferably cylindrical but may have other shapes compatible with a particular chuck 21 in order to prevent slippage of the bit relative to the chuck during drilling.

Figure 1A:
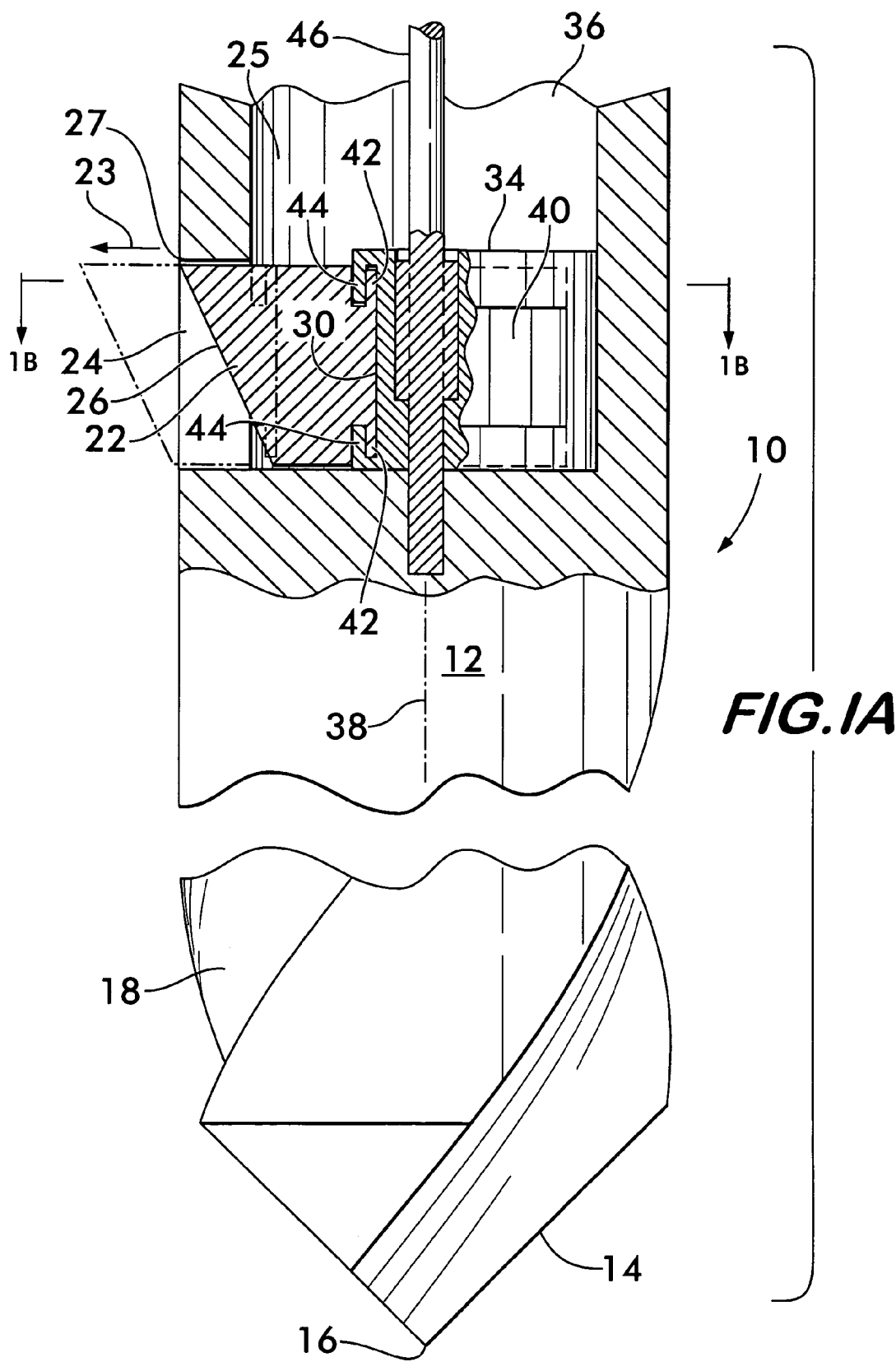
FIG. 1A is a partial longitudinal sectional view of the tool on an enlarged scale taken at line 1A—1A of FIG. 1.
Figure 1B:
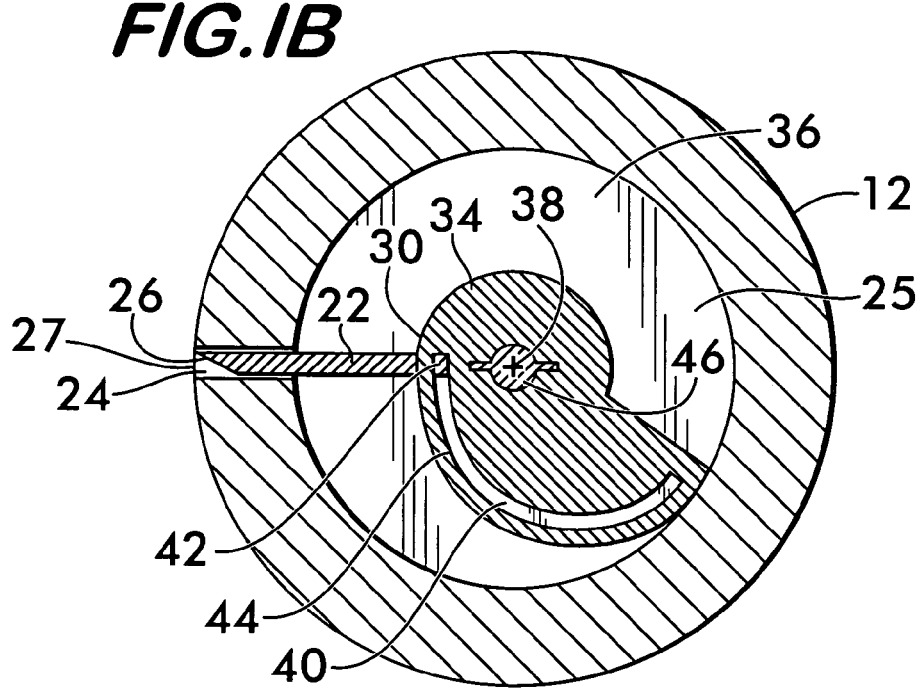
FIGS. 1B and 1C are cross-sectional views of the tool on an enlarged scale taken at line 1B—1B of FIG. 1A.
Figure 1C:
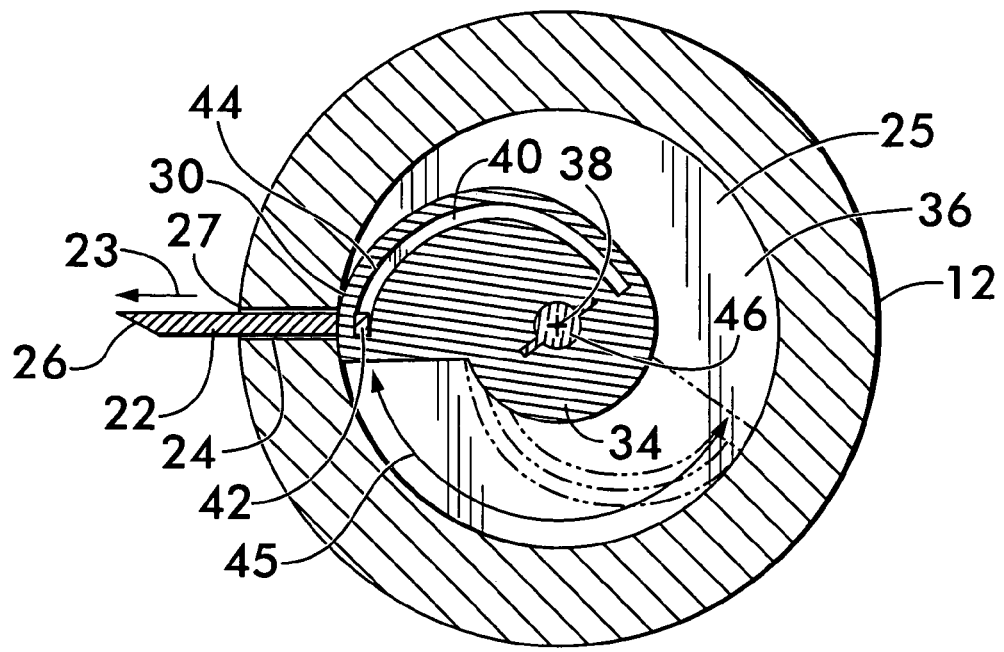

A cutting blade 22 is slidably positioned within a slot 24 positioned within the bit shaft 12 in spaced relation to the cutting tip 16. As shown by arrow 23 in FIG. 1A, blade 22 is movable radially relatively to the bit shaft 12 within the slot 24 between a retracted position, shown in solid line with the blade 22 located within a chamber 25 in the bit shaft 12, and a deployed or extended position, shown in broken line with the blade 22 extending substantially radially outwardly from the bit shaft through an opening 27 defined by the slot 24. Blade 22 has an outwardly facing cutting edge 26 and a cam follower 30 facing inwardly of the bit shaft 12 and positioned opposite to the cutting edge 26. Cam follower 30 engages an eccentric cam 34, best shown in FIGS. 1B and 1C. The cam 34 is rotatably mounted within chamber 25 and oriented substantially longitudinally within bit shaft 12. The cam 34 is rotatable about the longitudinal axis 38 of the bit 10 and has a circumferential slot 40 which defines an eccentric path and receives the cam follower 30 projecting from the cutting blade 22. As shown in FIG. 1A, the cam follower 30 has a pair of oppositely extending flanges 42 which engage respective shoulders 44 positioned on cam 34 and defining slot 40. As best shown in FIG. 1C, rotation of the cam 34 about axis 38 in a first direction (indicated by arrow 45) relative the bit shaft 12 forces the blade 22 to slide radially outwardly from bit shaft 12 through the slot 24 in the direction indicated by arrow 23. The radial motion of the blade 22 is due to the eccentric nature of the cam 34 and the engagement of the cam follower 30 within slot 40. Rotation of cam 34 in the opposite direction relative to bit shaft 12 draws the blade 22 back within the bit shaft 12, the flanges 42 on cam follower 30 engaging the shoulders 44 on cam 34.

As shown in FIG. 1A, a camshaft 46 extends from beyond the tang 20 though a longitudinal passageway 36 through the bit shaft 12, the camshaft 46 being attached to the cam 34. Rotation of the camshaft 46 about axis 38 relatively to bit shaft 12 deploys and retracts the blade 22 as described above. Preferably, the drill in which the tool 10 is mounted will have a mechanism engaging camshaft 46 allowing the operator to rotate the camshaft in either direction relative to the bit shaft 12 during drilling.

In operation, as shown in FIG. 1, the tool 10 is mounted in chuck 21 of a drill with the blade 22 in the retracted position, shown in solid line in FIG. 1A. The tool 10 is turned to drill a hole 47 in a substrate 49, the camshaft 46 turning with the bit shaft 12. Once the bit 10 is sufficiently deep in the substrate to position the blade 22 at the desired location of an undercut 51, the camshaft 46 is turned relatively to the bit shaft 12, thereby turning the cam 34 in a direction indicated by arrow 45 as shown in FIG. 1C. Engagement of the cam 34 and cam follower 30 causes the blade 22 to move radially outwardly through slot 24 in the direction indicated by arrow 23, the cutting edge 26 engaging the substrate 49 adjacent to the blade 22 and carving out the undercut 51. The desired depth of the tool 10 into substrate 49 may be controlled by a depth gauge 53, indicated schematically by the dotted line in FIG. 1.

Camshaft 46 may be turned relative to bit shaft 12 in any number of ways. For example, if rotation of the cam 34 in the same direction as rotation of the advancing bit shaft 12 moves the blade 22 into the deployed position, then the camshaft 46 must be turned by the drill in the same direction as the bit shaft but at a higher speed so that the camshaft 46 moves relatively to the bit shaft and forces the blade 22 outwardly to cut against the substrate 49. If the camshaft 46 must turn in the opposite direction of the advancing bit shaft 12 to deploy the cutting blade 22, then deploying the blade 22 is effected by slowing or stopping the rotation of the camshaft 46 relative to the bit shaft 12. The term "direction of rotation of the advancing bit shaft" refers to the direction which the bit shaft turns to advance it into the substrate 49 while drilling the hole 47. Once the blade 22 is deployed to a desired extent, which may be partially extended or fully extended, the camshaft 46 is then turned in the same direction and at the same rate as the bit shaft 12 to keep the blade 22 at its desired extension position.

The shape of cutting edge 26, its length and the distance which it extends out from the bit shaft 12 determine the shape and size of the undercut 51. An angled cutting edge 26 as shown by way of example will produce a conical undercut having a shoulder 55 at one end to engage an expanding anchor device and prevent it from being pulled out of the substrate. A cutting edge 26 oriented substantially parallel to the bit shaft 12 will produce a cylindrical undercut with well defined shoulders at both ends. The length of blade 22 will determine the length of the undercut.

Once the undercut is formed, the blade 22 is retracted by reversing the direction which the camshaft 46 is turned relatively to the bit shaft 12. This may be done while the bit is stopped. The flanges 42 on the cam follower 30 are engaged by the shoulders 44 on cam 34 and the blade 22 is drawn into the slot 24 through camming action. Once the blade 22 is withdrawn fully within slot 24, the bit shaft 12 may be withdrawn from the hole 47.

FIGS. 2A and 2B show another embodiment 50 of a tool with a deployable cutting blade according to the invention. Tool 50 has a bit shaft 52 with angled cutting edges 54 at its cutting end 56 and a tang (not shown) at its opposite end. Helical grooves 58 extend along the surface 60 of the bit shaft. A longitudinal bore 62 is positioned, preferably coaxially, within bit shaft 52. Bore 62 is in communication with a chamber comprising a passageway 64 oriented at an angle 66 relatively to the bore 62. Passageway 64 leads to an opening 67 in the surface 60 of the bit shaft 52, the opening 67 being in spaced relation to cutting edges 54. Passageway 64 comprises an upper guide surface 68 and a lower guide surface 70. The guide surfaces are preferably curved for reasons described below.

A cutting blade 72 is moveably positioned within passageway 64. Blade 72 comprises a flexible and resilient blade shaft 74 which is deflected into a curved shape as it engages the guide surfaces 68 and 70 when the blade moves through the passageway 64. One end of blade shaft 74 has a cutting edge 76 which is extendible outwardly from the passageway 64 through opening 67 to carve the undercut within a substrate. The opposite end of the blade shaft 74 is attached to an actuating rod 78 slidably positioned within bore 62 of bit shaft 52. Actuating rod 78 extends along bore 62 outwardly through the tang. Blade shaft 74 is preferably fixedly attached to the actuating rod 78 in the manner of a cantilever so as to aid in the retraction of the blade 72 into the passageway 64 through spring action as described below.

Blade 72 is movable from a retracted position within passageway 64, shown in FIG. 2A, to an extended position, shown in FIG. 2B, by moving actuating rod 78 relatively to bit shaft 52 in the direction of arrow 80. This is preferably accomplished by a mechanism within the drill in which the tool 50 is mounted, the operator of the drill controlling the timing and the extent of the motion of the actuator rod 78. Motion of the actuator rod 78 in the direction of arrow 80 forces the blade 72 to move through passageway 64 in the direction of arrow 81, the blade cutting edge 76 extending outwardly through opening 67 to engage the substrate into which the bit 50 has penetrated and carve out an undercut as the tool 50 turns. Tension is required to draw the actuating rod 78 to deploy the blade 72. The tension arises due to the angle 66 of passageway 64, as well as the shape of guide surfaces 68 and 70. By adjusting the angle 66 of passageway 64 to be greater than the nominal angle which the blade 72 makes with actuating rod 78, the blade shaft 74 will be deflected as it is drawn through passageway 64. Similarly, curved guide surfaces 68 and 70 will also deflect the resilient blade shaft 74 of blade 72 as it moves through passageway 64. If the blade 72 were unrestrained, the resilient biasing of the blade shaft 74 would tend to straighten the blade 72 and draw it toward the actuating rod 78. The resilient biasing of the blade shaft 74 causes it to resist deflecting into the shape needed to pass through the passageway 64, but being flexible, the blade shaft 74 bends when the blade is forced into the passageway 64 by movement of the actuating rod 78.

The blade shaft 74 acts as a spring, and when tension on the actuating rod 78 is released the resilient biasing of the blade shaft causes it to engage the guide surfaces 68 and 70, which, by virtue of their shape, spacing and the orientation angle 66 of passageway 64 force the blade 72 to slide back into passageway 64 into the retracted position. It is expected that for curved guide surfaces 68 and 70 the retracting action will be augmented by cantilevering the blade 72 on the actuating rod 78, thereby increasing the biasing force of the blade shaft 74 which causes the blade to retract into the passageway.

Alternately, the guide surfaces 68 and 70 of passageway 64 may be substantially straight and spaced so as not to deflect the blade shaft 74, in which case the retraction of the blade 72 is effected mainly by moving the actuating rod 78 in the direction opposite to that of arrow 80, toward the cutting edges 54 of the tool 50.

Figure 3A:
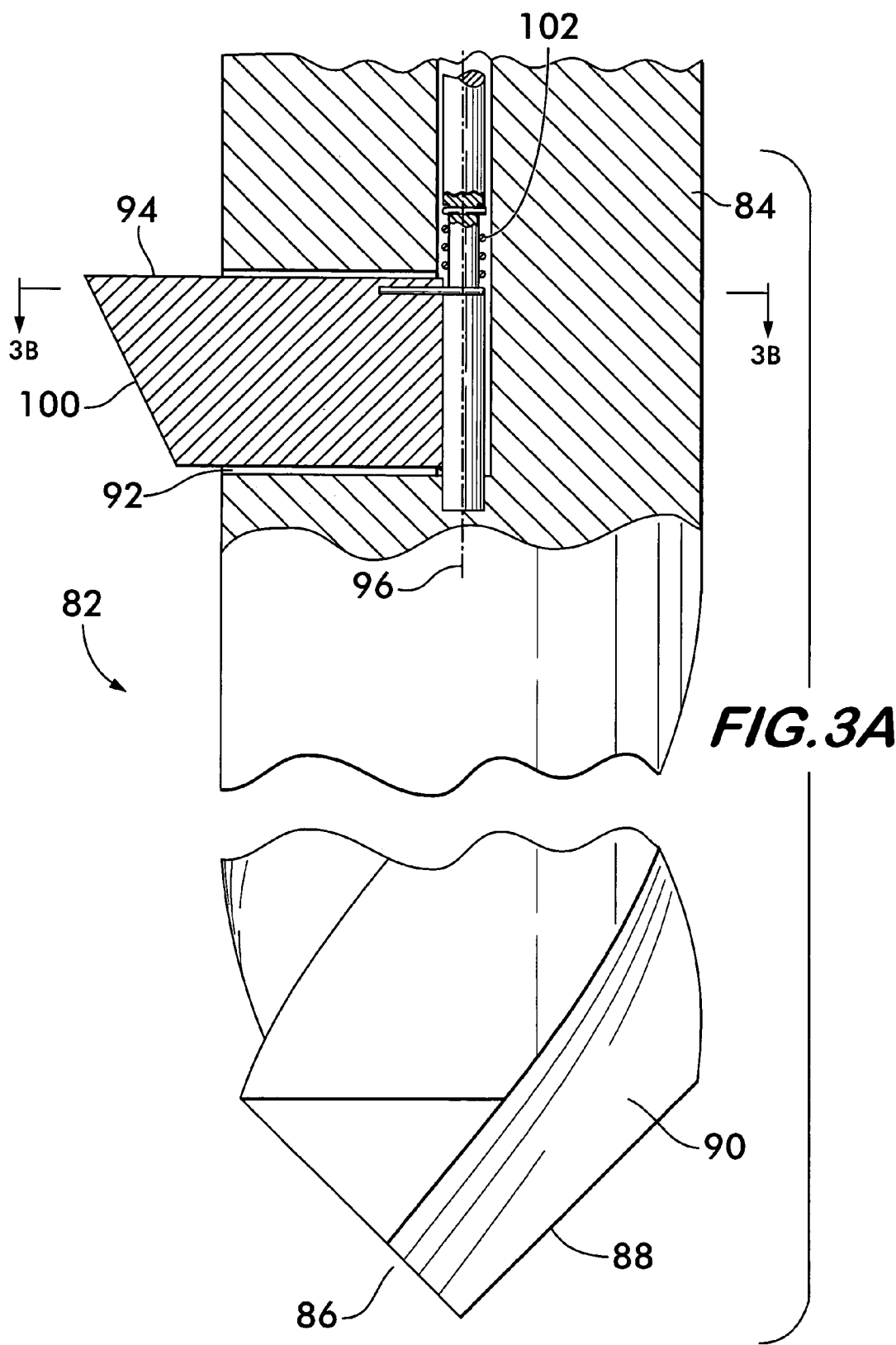
FIG. 3A is a partial longitudinal sectional view of yet another embodiment of the tool according to the invention.
Figure 3B:
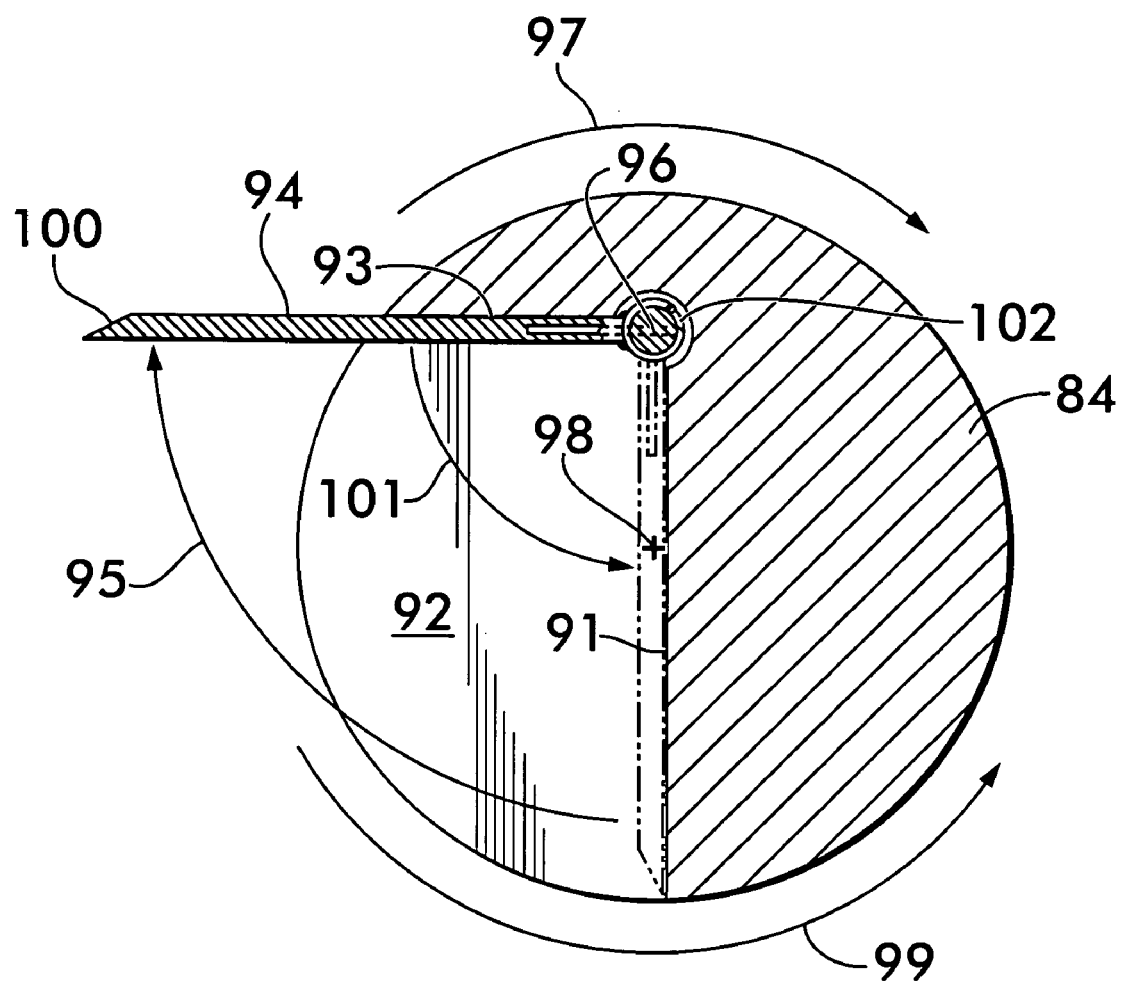
FIG. 3B is a cross-sectional view taken at line 3B—3B of FIG. 3A.

FIGS. 3A and 3B show yet another embodiment 82 of a tool with a deployable blade according to the invention. As with conventional drill bits, tool 82 has a bit shaft 84 comprising a cutting end 86 with angled cutting edges 88 and a tang (not shown) at the opposite end for engaging a chuck of a drill. Helical grooves 90 extend along the bit shaft 84 for debris removal during drilling.

An open chamber 92, best shown in section in FIG. 3B, is positioned within the bit shaft 84 in spaced relation to the cutting edges 88. The chamber 92 is defined by sidewalls 91 and 93 comprising the material of the bit shaft which remains after the chamber is formed. A cutting blade 94 is pivotally mounted within the chamber 92 on an axle 96. The axle 96 of blade 94 is positioned substantially aligned with but eccentric to or offset from the longitudinal axis 98 of bit shaft 84. As shown in broken line in FIG. 3B, the blade 94 is sized so as to fit substantially within the chamber 92 when it is positioned to intersect longitudinal axis 98 of bit shaft 84. However, when the blade 94 is rotated about its pivot axle 96 in the direction indicated by arrow 95, its cutting edge 100 extends outwardly from the bit shaft 84 due to the eccentric positioning of the pivot axle. Sidewalls 91 and 93 defining the chamber 92 serve as stops limiting the rotation of blade 94 about its pivot axle 96. The sidewalls may be set at various angles to one another to control the degree to which the blade 94 extends from the bit shaft 84. By way of example, the sidewalls 91 and 93 are shown oriented at 90° to one another.

Preferably, blade 94 is moved from its retracted position within the chamber 92 into its deployed position extending from the bit shaft 84 entirely by interaction with the substrate and depending upon the direction in which the tool 82 is turned. For a practical tool 82, the cutting edges 88 and grooves 90 are arranged so that when the tool is rotated in the direction of advance of the bit shaft 84 to effect a drilling function, the bit shaft turns about longitudinal axis 98 in a direction indicated by arrow 97 such that the substrate into which the drill penetrates engages the cutting edge 100 of blade 94 and keeps the blade in the retracted position within the chamber 92. After the tool 82 has penetrated the substrate to the desired depth, the direction of bit shaft rotation is reversed as indicated by arrow 99. Rotation of tool 82 in the direction of arrow 99 causes the cutting edge 100 of blade 94 to engage the substrate. Engagement with the substrate causes the blade to pivot about pivot axle 96 in the direction of arrow 95 until it engages the sidewall 93. Because pivot axle 96 is eccentric to the longitudinal axis 98 of the bit shaft 84, the blade 94 extends outwardly from the bit shaft 84 and carves an undercut in the substrate. To retract the blade 94 for removal of the tool 82 after the undercut has been carved out, a return spring 102 is used to rotate the blade in the direction of arrow 101 and bias it into the retracted position against sidewall 91. As shown in FIG. 3A, the return spring 102 is preferably a coil spring mounted coaxially with the eccentric pivot axle 96 of blade 94.

FIGS. 4A and 4B illustrate another embodiment 104 of a tool according to the invention. Again, tool 104 has a bit shaft 106 comprising a cutting end with angled cutting edges 108 and a tang (not shown) at the opposite end for engaging a chuck of a drill. Helical grooves 112 extend along the bit shaft 106 for debris removal during drilling.

A longitudinal bore 114 extends from the tang along bit shaft 106, preferably coaxial therewith. The bore 114 is adapted to receive a passageway 115 conveying pressurized fluid, preferably supplied through a coupling (not shown) at the tang. The coupling is designed to pass the hydraulic fluid from a stationary source to the passageway 115 which rotates with the bit 104 during drilling.

A chamber 116 is positioned in the bit shaft 106 in spaced relation to the cutting edges 108. A cutting blade 118 is pivotally mounted within the chamber 116 and rotates about a pivot axle 120 oriented transversely to the bit shaft 106. Blade 118 rotates about pivot axle 120 outwardly from chamber 116 in the direction indicated by arrow 122. A cutting edge 124 is positioned lengthwise along the blade. The blade 118 extends outwardly from the chamber 116 to engage the cutting edge 124 with a substrate to create an undercut therein when the bit shaft 106 turns. The blade 118 is biased by a spring 119 to normally remain within the chamber 116. Pivoting of the blade 118 in the direction of arrow 122 is effected by a balloon 126 positioned within the chamber 116. Balloon 126 engages blade 118 and is in fluid communication with the conduit 115. The balloon 126 receives pressurized fluid pumped into the bore 114 and inflates, as illustrated in FIG. 4B, to pivot the blade 118 about axle 120 against the biasing force of spring 119. The blade 118 moves outwardly from chamber 116 to engage the cutting edge 124 with the substrate and carve out the undercut. Deployment of the blade 118 is effected by the drill operator when the bit 104 is at the appropriate depth within the substrate. The blade 118 is retracted by the biasing spring 119 which moves the blade 118 back into the chamber 116 when the balloon 126 deflates. Preferably, the balloon is made of nylon, although other materials are also feasible.

Alternately, it is also feasible to fixedly mount a flexible, resilient blade cantilevered in the chamber 116 and allow the balloon 126 to resiliently deflect the blade outwardly from the chamber. The natural resilience of the blade biases it back into the chamber 116 in the absence of pressure within the balloon.

Another embodiment of a tool 128 according to the invention is illustrated in FIGS. 5, 5A, 5B, 5C and 5D. Tool 128 has a bit shaft 130 with angled cutting edges 132 at its cutting tip 134 and a tang (not shown) at its opposite end. Helical grooves 136 extend lengthwise along the bit shaft 130 for removal of debris during drilling.

A chamber 138 extends through bit shaft 130, positioned in spaced relation from the cutting tip 134. Preferably the chamber 138 extends through the thickness of the bit shaft 130 and is centered on a diameter of the bit shaft, although variations are envisioned wherein the chamber 138 may extend only part way through the bit shaft and may also be eccentrically located off the diameter.

A beam 140 is oriented with its long axis 142 substantially parallel to the length of the bit shaft 130. The beam 140 is positioned within chamber 138, with one end 144 fixedly mounted to the bit shaft in the manner of a cantilever. A cutting blade 146 is mounted on the opposite end of the beam, the beam being flexible and resilient, and free to bend into chamber 138 or outwardly therefrom to allow the blade 146 to project beyond the circumference of the bit shaft 130 and engage a substrate in which it is desired to create an undercut. It is preferred to bias the beam 140 so that, in the undeflected position, the blade 146 extends outwardly from the chamber 138 as shown in solid line in FIG. 5.

Figure 5:
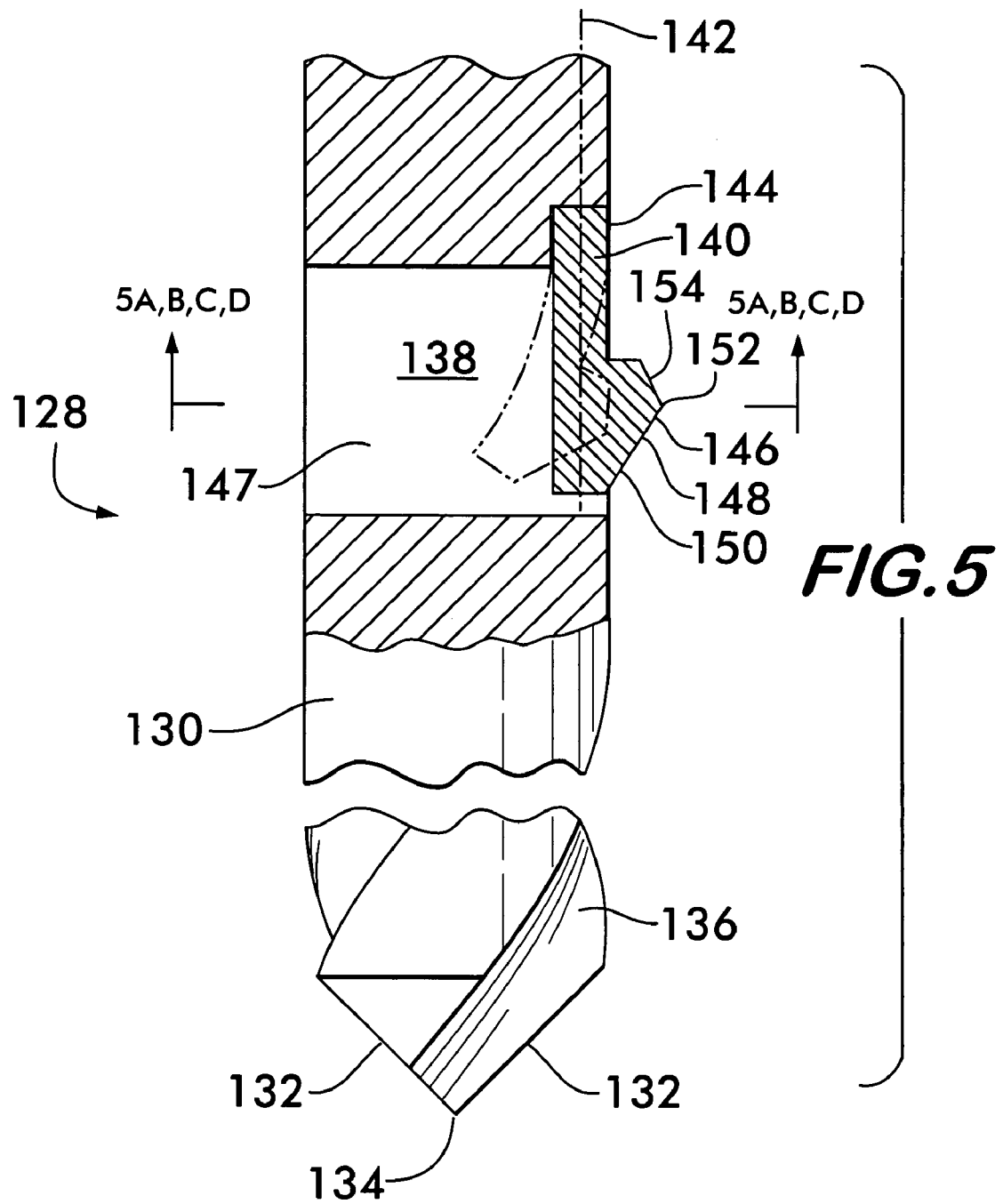
FIG. 5 is a partial longitudinal sectional view of yet another embodiment of a tool according to the invention.

As further shown in longitudinal section in FIG. 5, blade 146 preferably has a cutting edge 148 having a forward facing portion 150 which is angularly oriented with respect to the long axis 142 of the arm 140. The angle of the forward facing portion 150 causes the blade to widen along the arm toward the cantilevered end 144, the blade 146 being widest at an apex 152. Adjacent to the apex the cutting edge 148 preferably has a reward facing portion 154 which is angled in the opposite sense as forward facing portion 150 so as to narrow the width of blade 146 from the apex 152 to the cantilevered end 144 of beam 140.

Figure 5A:
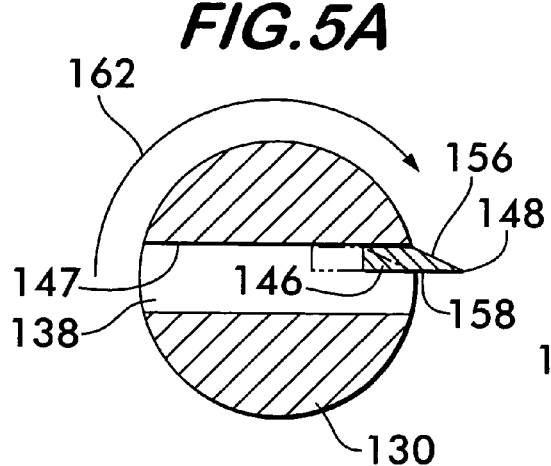
FIGS. 5A and 5B are cross-sectional views taken at line 5A, B—5A, B of FIG. 5.
Figure 5B:
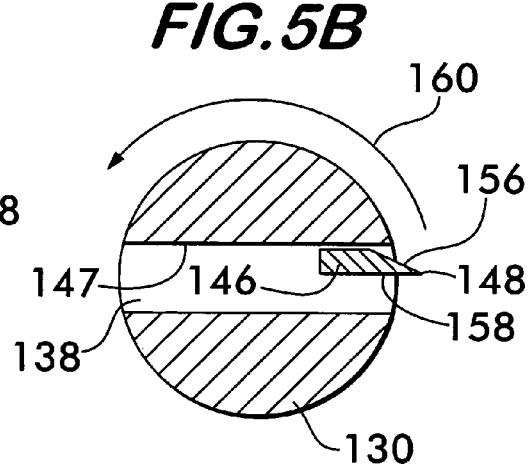

FIGS. 5A and 5B show the blade 146 in cross section. One face 156 of the blade 146 is preferably angled so that the blade thickens in the direction away from the cutting edge 148. The opposite face 158 is preferably substantially flat across the width of the blade.

Figure 5C:
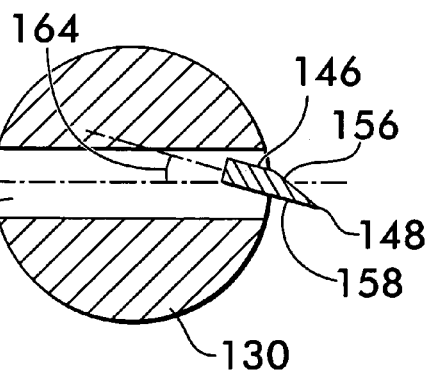
FIGS. 5C and 5D are cross-sectional views taken at line 5C—5C and 5D—5D, respectively, of FIG. 5 showing further alternate embodiments.
Figure 5D:
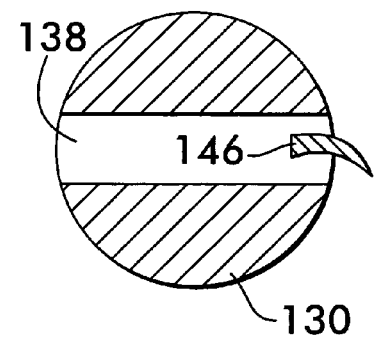

The blade geometry described above is designed to enable the tool embodiment 128 to drill into a substrate, form an undercut beneath the substrate surface and then be easily removed from the substrate without damaging it. In operation, the tool 128 is advanced into a substrate by counter clockwise rotation when viewed from the cutting tip 134 as indicated by arrow 160 in FIG. 5B. As the bit shaft 130 advances into the substrate the forward facing portion 150 of the cutting edge 148 engages the substrate at the edge of the hole being formed and acts as a ramp which causes the beam 140 to deflect inwardly into chamber 138 as the blade travels beneath the substrate surface. The deflected position of blade 146 is shown in broken line in FIG. 5. Blade 146 does not cut into the substrate when the bit shaft 130 is rotated counter clockwise because it is free to deflect into the chamber 138. Once the tool 128 has penetrated to the proper depth so as to position blade 146 where the undercut is desired, the rotation of the tool 128 is reversed to the clockwise direction as indicated by arrow 162 in FIG. 5A. When rotated clockwise, the tool 128 no longer advances but the blade 146 is pushed against the chamber sidewall 147 and the flat face 158 of the cutting edge 148 digs into the substrate and forms the undercut. The resilience of the beam 140 combined with the flat blade angle of the flat face 158 and the support of sidewall 147 causes the cutting edge 148 to move radially outwardly into the substrate, carving the undercut as it rotates. Shavings of the substrate enter the chamber 138 and are removed with the bit 128. As shown in FIG. 5C, the flat face 158 may be set at an angle 164 relative to the radial direction to provide a more aggressive cut to the blade, i.e., the blade 146 takes a bigger cut with each rotation. Alternately, as shown in FIG. 5D, the blade 146 may be curved so as to dig into the substrate during clockwise rotation but slide over the substrate and not cut during counter clockwise rotation.

Once the undercut is formed beneath the substrate surface, the rotation of tool 128 is stopped and the bit is withdrawn. The reward facing portion 154 of cutting edge 148 engages the substrate and acts as a ramp to deflect the beam 140 into chamber 138, thereby positioning blade 146 within the chamber and allowing the tool to be conveniently withdrawn without damaging the undercut or the hole in the substrate surface.

Preferred materials for the tools according to the invention described above include steel, as well as stainless steel and titanium, being used for drilling in bone matter so as not to contaminate the bone with oxides or other contaminants. Practical sized tools for use in bone matter range between 2 mm and 6 mm.

Tools according to the invention able to both drill and cut an undercut provide a significant advantage especially in the context of surgical operations because use of such tools eliminates the step of first drilling a pilot hole from the procedure, thereby reducing the time for the procedure and the possibility of error.

What is claimed is:

1. A tool for making an undercut in a substrate, said tool comprising:
    an elongated bit shaft having a cutting tip positioned at one end and a tang positioned at an opposite end, said bit shaft being rotatable about a lengthwise axis to bore an opening in said substrate with said cutting tip;
    a chamber located within said bit shaft and positioned between said cutting tip and said tang, said chamber having an opening providing access thereto;
    a cutting blade positioned within said chamber, said cutting blade being movable between a retracted position within said chamber and an extended position projecting outwardly from said bit shaft through said opening; and
    means for moving said cutting blade between said retracted and extended positions, said cutting blade forming said undercut when in said extended position upon rotation of said bit shaft, wherein said blade moving means comprises an axle positioned within said chamber, the chamber being defined by first and second sidewalls angularly oriented with respect to one another, said axle being substantially lengthwise aligned with and offset from the longitudinal axis of said bit shaft, said cutting blade being mounted on said axle between said sidewalls for pivoting motion into and out of said chamber, rotation of said bit shaft in a first direction causing said blade member to pivot on said axle and move into said chamber against said first sidewall upon contact between said blade and said substrate, rotation of said bit shaft in an opposite direction causing said cutting blade to pivot on said axle and move out of said chamber and into engagement with said second sidewall upon contact between said blade and said substrate.

2. A tool according to claim 1, wherein said first and second sidewalls are oriented at 90° to one another.

3. A tool according to claim 1, wherein said first direction corresponds with the direction of advance of said bit shaft through said substrate.

4. A tool according to claim 1, further comprising a biasing member engaging said culling blade and biasing it into said retracted position.

5. A tool according to claim 1, wherein the bit shaft configured to have a helical groove along the length of the bit shaft.

6. A tool according to claim 4, wherein the biasing member comprises a return spring.

7. A tool according to claim 6, wherein the return spring comprises a coil spring.

8. A tool according to claim 1, wherein the lengthwise axis is substantially radially central to the bit shaft.

9. A tool according to claim 4, wherein the biasing member is coaxial with the axle.

10. A tool according to claim 1, further comprising a first stop configured to limit rotation of the cutting blade.

11. A tool according to claim 10, wherein the first stop comprises the first sidewall.

12. A tool according to claim 10, wherein the first stop is configured to limit rotation of the cutting blade in the first direction.

13. A tool according to claim 10, further comprising a second stop configured to limit rotation of the cutting blade.

14. A tool according to claim 13, wherein the second stop comprises the second sidewall.

15. A tool according to claim 13, wherein the second stop is configured to limit rotation of the cutting blade in the second direction.

16. A tool according to claim 1, wherein the second direction corresponds with the direction of withdraw of the bit shaft through the substrate.

17. A tool according to claim 1, wherein the first sidewall and the second sidewall comprise of a material of the bit shaft.

18. A tool according to claim 17, wherein the material is steel.

19. A tool according to claim 18, wherein the material is stainless steel.

20. A tool according to claim 17, wherein the material is titanium.

* * * * *